(12) United States Patent
Shotton et al.

(10) Patent No.: US 9,911,032 B2
(45) Date of Patent: *Mar. 6, 2018

(54) TRACKING HAND/BODY POSE

(71) Applicant: Microsoft Technology Licensing, LLC, Redmond, WA (US)

(72) Inventors: Jamie Daniel Joseph Shotton, Cambridge (GB); Cem Keskin, Seattle, WA (US); Jonathan Taylor, Toronto (CA); Toby Sharp, Cambridge (GB); Shahram Izadi, Bellevue, WA (US); Andrew William Fitzgibbon, Cambridge (GB); Pushmeet Kohli, Cambridge (GB); Duncan Paul Robertson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,680

(22) Filed: Jan. 4, 2017

(65) Prior Publication Data

US 2017/0116471 A1 Apr. 27, 2017

Related U.S. Application Data

(63) Continuation of application No. 14/494,431, filed on Sep. 23, 2014, now Pat. No. 9,552,070.

(51) Int. Cl.
*G06K 9/00* (2006.01)
*G06K 9/66* (2006.01)
(Continued)

(52) U.S. Cl.
CPC ......... *G06K 9/00335* (2013.01); *G06F 3/011* (2013.01); *G06F 3/017* (2013.01);
(Continued)

(58) Field of Classification Search
CPC ........... G06K 9/00335; G06K 9/00342; G06K 9/00355; G06K 9/00362; G06K 9/00369;
(Continued)

(56) References Cited

U.S. PATENT DOCUMENTS 7,340,077 B2 * 3/2008 Gokturk ................. G06F 3/017
348/208.14
7,940,960 B2 * 5/2011 Okada ................ G06K 9/00369
382/103
(Continued)

FOREIGN PATENT DOCUMENTS

EP 2590110 5/2013
EP 2595090 5/2013

OTHER PUBLICATIONS

"Leap Motion Inc", Aug. 20, 2014, Available at: http:/fleapmotion.com/product.
(Continued)

*Primary Examiner* — Jose Couso
(74) *Attorney, Agent, or Firm* — Schwegman Lundberg & Woessner, P.A.

(57) ABSTRACT

Tracking hand or body pose from image data is described, for example, to control a game system, natural user interface or for augmented reality. In various examples a prediction engine takes a single frame of image data and predicts a distribution over a pose of a hand or body depicted in the image data. In examples, a stochastic optimizer has a pool of candidate poses of the hand or body which it iteratively refines, and samples from the predicted distribution are used to replace some candidate poses in the pool. In some examples a best candidate pose from the pool is selected as the current tracked pose and the selection processes uses a 3D model of the hand or body.

20 Claims, 9 Drawing Sheets

(51) Int. Cl.
- *G06K 9/62* (2006.01)
- *G06K 9/52* (2006.01)
- *G06F 3/01* (2006.01)
- *G06F 3/03* (2006.01)

(52) U.S. Cl.
CPC ....... *G06F 3/0304* (2013.01); *G06K 9/00342* (2013.01); *G06K 9/00355* (2013.01); *G06K 9/52* (2013.01); *G06K 9/6219* (2013.01); *G06K 9/6263* (2013.01); *G06K 9/6267* (2013.01); *G06K 9/6282* (2013.01); *G06K 9/66* (2013.01)

(58) Field of Classification Search
CPC ........... G06K 9/00375; G06K 9/00201; G06K 9/00204; G06K 9/00718; G06K 9/4671; G06K 9/52; G06K 9/6219; G06K 9/6263; G06K 9/6267; G06K 9/6269; G06K 9/6282; G06K 9/66; G06K 9/00288; G06K 9/00281; G06K 9/00308; G06K 9/00536; G06K 9/6292; G06K 9/3241; G06K 9/6227; G06K 9/6276–9/6287; G06T 7/246; G06T 7/251; G06T 7/344; G06T 7/70; G06T 7/75; G06T 13/40; G06T 13/80; G06T 17/00; G06T 2200/04; G06T 2200/08; G06T 2207/10016; G06T 2207/10028; G06T 2207/20076; G06T 2207/20081; G06T 2207/30196; G06T 2207/30241; G06T 2207/30244; G06F 3/011; G06F 3/017; G06F 3/0304; A61B 5/1113; A61B 5/1114; A61B 5/1116; A61B 5/1128; A61B 5/4528; G05B 2219/40409; G05B 2219/40413; H04N 5/23219; H04N 13/0468; H04N 21/46651; H04N 21/42201

See application file for complete search history.

(56) References Cited

U.S. PATENT DOCUMENTS

| | | | |
|---|---|---|---|
| 8,355,529 B2 | 1/2013 | Wu et al. | |
| 8,437,506 B2 | 5/2013 | Williams et al. | |
| 8,600,166 B2* | 12/2013 | Adhikari | G06F 3/017 382/190 |
| 8,724,906 B2 | 5/2014 | Shotton et al. | |
| 8,958,600 B2 | 2/2015 | Othmezouri et al. | |
| 9,098,740 B2* | 8/2015 | Yoo | G06K 9/00375 |
| 9,098,766 B2* | 8/2015 | Dariush | G06K 9/00362 |
| 9,262,674 B2* | 2/2016 | Kawaguchi | G06T 7/77 |
| 9,377,861 B2* | 6/2016 | Yamaoka | G06K 9/00369 |
| 9,536,136 B2* | 1/2017 | Kounavis | G06K 9/00355 |
| 9,684,380 B2* | 6/2017 | Kramer | G06F 3/017 |
| 9,747,023 B2* | 8/2017 | Kamamori | G06F 3/0425 |
| 2006/0045310 A1 | 3/2006 | Tu et al. | |
| 2009/0232353 A1 | 9/2009 | Sundaresan et al. | |
| 2011/0249865 A1 | 10/2011 | Lee et al. | |
| 2012/0268364 A1 | 10/2012 | Minnen | |
| 2013/0156260 A1 | 6/2013 | Craig | |
| 2013/0249908 A1 | 9/2013 | Black et al. | |
| 2013/0250050 A1 | 9/2013 | Kanaujia et al. | |
| 2014/0307927 A1* | 10/2014 | Folmer | A61B 5/7267 382/107 |
| 2014/0324888 A1* | 10/2014 | Xie | G06F 3/017 707/748 |
| 2015/0269425 A1* | 9/2015 | Mazurenko | G06K 9/00355 382/103 |
| 2016/0085310 A1 | 3/2016 | Shotton et al. | |
| 2016/0282953 A1* | 9/2016 | Yamaoka | G06K 9/00369 |
| 2017/0192515 A1* | 7/2017 | Menadeva | G06F 3/017 |
| 2017/0231577 A1* | 8/2017 | Ben Shalom | A61B 5/7275 600/595 |
| 2017/0262064 A1* | 9/2017 | Ofir | G06F 3/017 |

OTHER PUBLICATIONS

"Second Written Opinion Issued in PCT Application No. PCT/US2015/050315", dated Sep. 14, 2016, 7 Pages.
"Non Final Office Action Issued in U.S. Appl. No. 14/494,431", dated Feb. 3, 2016, 10 Pages.
"Non Final Office Action Issued in U.S. Appl. No. 14/494,431", dated May 16, 2016, 9 Pages.
"Notice of Allowance issued in U.S. Appl. No. 14/494,431", dated Sep. 13, 2016, 6 Pages.
Athitsos, et al., "Estimating 3D hand pose from a cluttered image", In Proceedings of IEEE Computer Society Conference on Computer Vision and Pattern Recognition, Jun. 16, 2003, 8 Pages.
Ballan, et al., "Motion Capture of Hands in Action using Discriminative Salient Points", In Proceedings of 12th European Conference on Computer Vision, Oct. 7, 2012, 14 Pages.
Bray, et al., "Smart Particle Filtering for 3D Hand Tracking", In Proceedings of the Sixth IEEE International Conference on Automatic Face and Gesture Recognition, May 17, 2004, 6 Pages.
Criminisi, et al., "Decision Forests for Computer Vision and Medical Image Analysis", In Book Advances in Computer Vision and Pattern Recognition 2013, Feb. 7, 2013, 2 Pages.
Dam, et al., "Quaternions, Interpolation and Animation", In Technical Report DIKU-TR-98/5, University of Copenhagen, Jul. 17, 1998, 103 Pages.
Dipietro, et al., "A Survey of Glove-Based Systems and their Applications", In IEEE Transactions on Systems, Man, and Cybernetics, Part C: Applications and Reviews, vol. 38, Issue 4, Jul. 2008, 22 Pages.
Erol, et al., "Vision-based Hand Pose Estimation: A review", In Proceedings of Computer Vision and Image Understanding 108, Oct. 2007, 22 Pages.
Gall et al., "Global Stochastic Optimization for Robust and Accurate Human Motion Capture", In Technical Report MPI-1-2007-4-008, Dec. 2007, 28 Pages.
Gall et al., "Hough Forests for Object Detection, Tracking, and Action Recognition", In IEEE Transactions on Pattern Analysis and Machine Intelligence, vol. 33, Issue No. 11, Nov. 2011, 15 Pages.
Girshick, et al., "Efficient Regression of General-Activity Human Poses from Depth Images", In Proceedings of the International Conference on Computer Vision, Nov. 6, 2011, 8 Pages.
Gorce, et al., "Model-based 3D Hand Pose Estimation from Monocular Video", In IEEE Transactions on Pattern Analysis and Machine Intelligence, vol. 33, Issue 9, Sep. 2011, 14 Pages.
Heap et al., "Towards 3D Hand Tracking using a Deformable Model", In Proceedings of the Second International Conference on Automatic Face and Gesture Recognition, Oct. 14, 1996, 6 Pages.
Juang, Chia-Feng, "A Hybrid of Genetic Algorithm and Particle Swarm Optimization for Recurrent Network Design", In Proceedings of the IEEE Transactions on Systems, Man, and Cybernetics—Part B: Cybernetics, vol. 34, Issue 2, Apr. 2004, 10 Pages.
Keskin, et al., "Hand Pose Estimation and Hand Shape Classification using Multilayered Randomized Decision Forests", In Proceedings of the 12th European Conference on Computer Vision, Oct. 7, 2012, 4 Pages.
Kim, et al., "Digits: Freehand 3D Interactions Anywhere using a Wrist-Worn Gloveless Sensor", In Proceedings of the 25th annual ACM symposium on User interface software and technology, Oct. 7, 2012, 10 Pages.
Krupka, et al., "Discriminative Ferns Ensemble for Hand Pose Recognition", In Proceedings of the IEEE Conference on Computer Vision and Pattern Recognition, Jun. 23, 2014, 8 Pages.
Laptev, et al., "Tracking of multi-state hand models using particle filtering and a hierarchy of multi-scale image featrues", In Technical report CVAP245, ISRN KTH/NA/P-00/12-SE, Sep. 2000, 19 Pages.
Melax, et al., "Dynamics Based 3D Skeletal Hand Tracking", In Proceedings of Graphics Interface, May 29, 2013, 8 Pages.
Oikonomidis, et al., "Efficient Model-Based 3D Tracking of Hand Articulations using Kinect", In Proceedings of British Machine Vision Conference, Aug. 29, 2011, 11 Pages.
Oikonomidis, et al., "Evolutionary Quasi Random Search for Hand Articulations Tracking", In Proceedings of the IEEE Conference on Computer Vision and Pattern Recognition, Jun. 23, 2014, 8 Pages.

(56) References Cited

OTHER PUBLICATIONS

Oikonomidis, et al., "Full DOF Tracking of a Hand Interacting with an Object by Modeling Occlusions and Physical Constraints", In Proceedings of the IEEE International Conference on Computer Vision, Nov. 6, 2011, 8 Pages.

Oikonomidis, et al., "Tracking the Articulated Motion of Two Strongly Interacting Hands", In Proceedings IEEE Conference on the Computer Vision and Pattern Recognition, Jun. 16, 2014, 8 Pages.

"International Search Report and Written Opinion Issued in PCT Application No. PCT/US2015/050315", dated Dec. 3, 2015, 11 Pages.

"3 Gear Systems Inc.", Retrieved from <<https://web.archive.org/web/20110210122559/http://threegear.com>>, Aug. 19, 2014, 1 Page.

Qian et al., "Realtime and Robust Hand Tracking from Depth", In Proceedings of Computer Vision and Pattern Recognition, Jun. 2014, 8 Pages.

Shotion, et al., "Decision Jungles: Compact and Rich Models for Classification", In Proceedings of Advances in Neural Information Processing Systems, Dec. 5, 2013, 9 Pages.

Shotion, et al., "Real-Time Human Pose Recognition in Parts from a Single Depth Image", In Proceedings of Computer Vision and Pattern Recognition, Jun. 2011, 8 Pages.

Sidenbladh, et al., "Stochastic Tracking of 3D Human Figures Using 2D Image Motion", In Proceedings of the 6th European Conference on Computer Vision—Part II, Jun. 26, 2000, 18 Pages.

Sridhar et al., "Interactive Markerless Articulated Hand Motion Tracking using RGB and Depth Data", In Proceedings of IEEE International Conference on Computer Vision, Dec. 3, 2013, 8 Pages.

Stenger, et al., "Model-Based 3D Tracking of an Articulated Hand", In Proceedings of IEEE Computer Society Conference on Computer Vision and Pattern Recognition, Dec. 8, 2001, 6 Pages.

Sun, et al., "Conditional Regression Forests for Human Pose Estimation", In Proceedings of IEEE Conference on Computer Vision and Pattern Recognition, Jun. 16, 2012, 8 Pages.

Tang, et al., "Latent Regression Forest: Structured Estimation of 3D Articulated Hand Posture", In Proceedings of IEEE Conference on Computer Vision and Pattern Recognition, Jun. 9, 2014, 8 Pages.

Tang, et al., "Real-Time Articulated Hand Pose Estimation using Semi-Supervised Transductive Regression Forests", In Proceedings of IEEE International Conference on Computer Vision, Sep. 30, 2013, 8 Pages.

Taylor et al., "The Vitruvian Manifold: Inferring Dense Correspondences for One-Shot Human Pose Estimation", In IEEE Conference on Computer Vision and Pattern Recognition, Jun. 16, 2012, 8 Pages.

Taylor, et al., "User-Specific Hand Modeling from Monocular Depth Sequences", In IEEE Conference on Computer Vision and Pattern Recognition, Jun. 24, 2014, 8 Pages.

Tompson et al., "Real-Time Continuous Pose Recovery of Human Hands using Convolutional Networks", In Proceedings of ACM Transactions on Graphics, vol. 33, Issue 4, Jul. 2014, 10 Pages.

Wang, et al., "6D Hands: Markerless Hand-Tracking for Computer Aided Design", Proceedings of the 24th annual ACM symposium on User interface software and technology, Oct. 16, 2011, 9 Pages.

Wang, et al., "Real-Time Hand-Tracking with a Color Glove", Proceedings of ACM Transactions on Graphics, vol. 28, No. 3, Jul. 2009, 8 Pages.

Wang, et al., "Video-Based Hand Manipulation Capture through Composite Motion Control", n Proceedings of ACM Transactions on Graphics, vol. 32, Issue 4, Jul. 21, 2013, 14 Pages.

Wu, et al., "Capturing Natural Hand Articulation", In Proceedings of the 8th International Conference on Computer Vision, vol. 2, Jul. 7, 2001, 7 Pages.

Wu, et al., "View-Independent Recognition of Hand Postures", Proceedings of IEEE Conference on Computer Vision and Pattern Recognition, Jun. 13, 2000, 7 Pages.

Xu, et al., "Efficient Hand Pose Estimation from a Single Depth Image", In Proceedings of the IEEE International Conference on Computer Vision, Dec. 1, 2013, 7 Pages.

Yuille, et al., "Vision as Bayesian Inference: Analysis by Synthesis?", In Proceedings of Trends in Cognitive Sciences, vol. 10, Jul. 2006, 8 Pages.

Zhao, et al., "Combining Markerbased Mocap and RGB-D Camera for Acquiring High-Fidelity Hand Motion Data", In Proceedings of the ACM SIGGRAPH/Eurographics Symposium on Computer Animation, Jul. 29, 2012, 10 Pages.

\* cited by examiner

FIG. 9 ic # TRACKING HAND/BODY POSE

CROSS REFERENCE TO RELATED APPLICATIONS

This patent application is a continuation application of, and claims priority to, commonly owned U.S. patent application Ser. No. 14/494,431, entitled "Tracking Hand/Body Pose", filed on Sep. 23, 2014, which application is incorporated herein by reference.

BACKGROUND

Real-time articulated hand tracking from image data has the potential to open up new human-computer interaction scenarios. However, the dexterity and degrees-of-freedom of human hands makes visual tracking of a fully articulated hand challenging. This also applies to real-time articulated body tracking.

The embodiments described below are not limited to implementations which solve any or all of the disadvantages of known hand/body pose trackers.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Tracking hand or body pose from image data is described, for example, to control a game system, natural user interface or for augmented reality. In various examples a prediction engine takes a single frame of image data and predicts a distribution over a pose of a hand or body depicted in the image data. In examples, a stochastic optimizer has a pool of candidate poses of the hand or body which it iteratively refines, and samples from the predicted distribution are used to replace some candidate poses in the pool. In some examples a best candidate pose from the pool is selected as the current tracked pose and the selection processes uses a 3D model of the hand or body.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
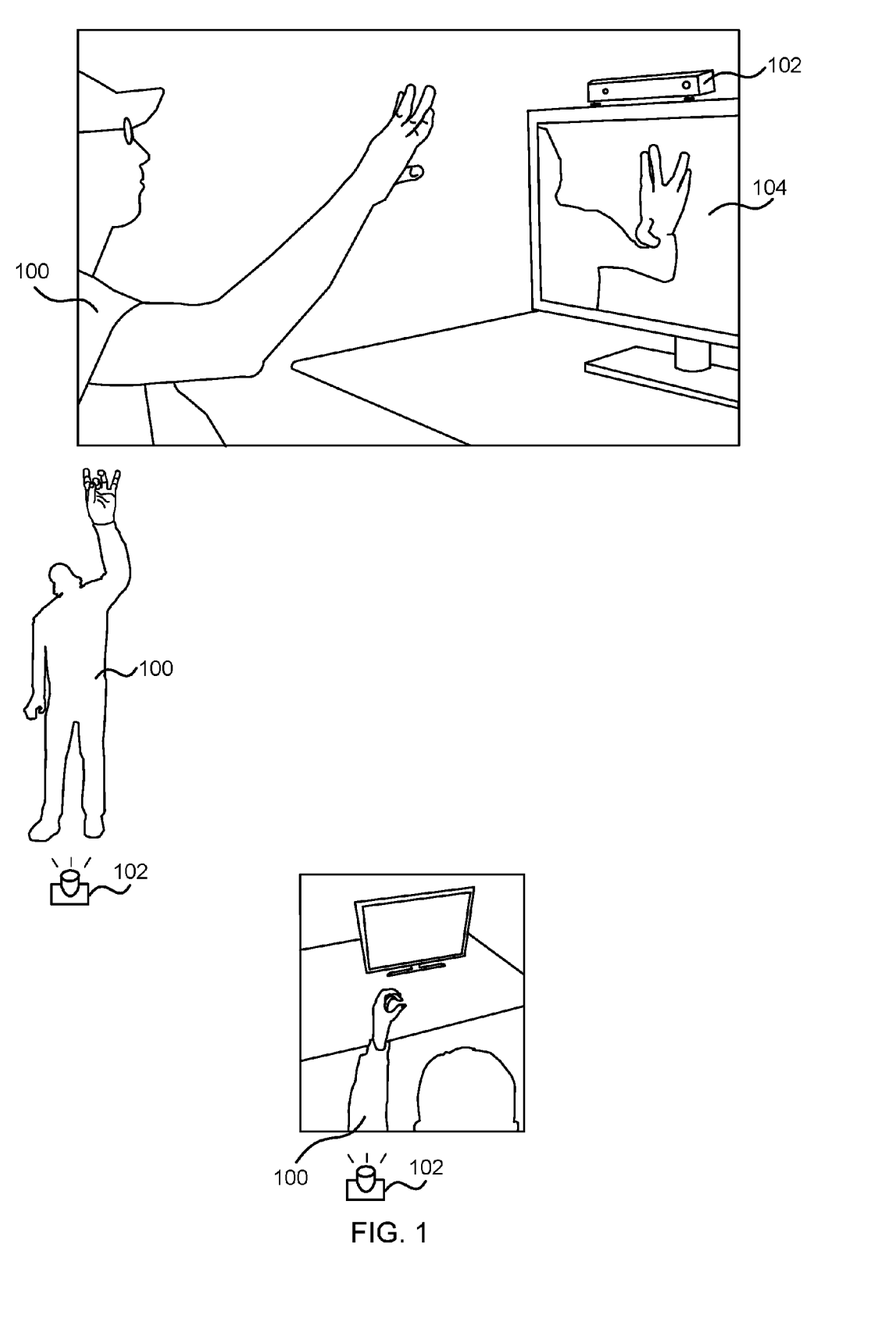
FIG. 1 is a schematic diagram of tracking hand pose using an image capture device which is forward facing, upward facing or over the shoulder of a user.

FIG. 1 is a schematic diagram of tracking hand pose using an image capture device 102 which is forward facing, upward facing or over the shoulder of a user 100. In the example shown in the top part of FIG. 1 the user 100 is sitting at a desk making hand gestures in front of a display screen 104 on top of which is the image capture device 102. In this example, an image of a hand is rendered on the display screen 104 according to a 3D hand model and tracked pose of the user's hand. However, this is an example only and the tracked pose may be used for other tasks such as controlling a graphical user interface, augmented reality applications, video gaming, and others.

In the example shown in the middle part of FIG. 1 the user is standing and making hand gestures above an image capture device 102 which is on the floor. In the example shown in the lower part of FIG. 1 the user is sitting at a desk and the image capture device 102 is over the shoulder of the user 100.

A user's hand has many degrees of freedom, can undergo a variety of complex poses, suffers from occlusions, and has many local shape similarities. Various examples of hand trackers described herein have improved accuracy in recovered hand poses. For example, by using a new processing pipeline where a prediction engine is able to predict, from a single frame if needed, a distribution over hand pose. Previous approaches have not predicted distributions over hand pose. The term "hand pose" is used here to refer to a global position and global orientation of a hand and also a plurality of joint angles of the hand. For example, hand pose may comprise more than 10 or more than 20 degrees of freedom depending on the detail and complexity of a hand model used. By enabling the prediction engine to operate from a single frame, on a per-frame basis, robustness is improved as compared with previous approaches. This is because the prediction engine is able to predict the full degree of freedom pose of the hand from a single frame with no tracking history. The term "robustness" is used here to mean the ability to recover well from tracking failures which occur for various reasons. For example, sudden hand movements, occlusions of the hand by other objects such as another hand, a coffee mug, the user's hair, changes in lighting conditions, and others.

Predicting a distribution over hand pose, from a single frame if needed, is not straightforward. In various examples this is achieved by breaking the prediction process into stages or hierarchies. For example, by predicting a distribution over global rotation bins in a first stage, and then predicting further distributions in a second stage. The further distributions may be distributions over a quaternion angle representation of rotation, over translation offsets, and over pose within a particular pose class. The amount of memory and computational resources for a machine learning system to predict the distribution over hand pose is managed and reduced by using the layered approach. In this way the hand tracker is workable for practical applications such as for desktop computers, mobile phones, tablet computers and other operating environments. In some examples efficiencies and memory savings are also achieved by using specialized types of machine learning system at the different layers. In some examples, a particularly effective approach has been found to be using ferns at a first layer of the prediction engine and jungles at a second layer of the prediction engine.

In various examples the prediction engine is used in combination with a stochastic optimizer to give improved accuracy. A stochastic optimizer is an iterative process of searching for a solution to a problem, where the iterative processes uses randomly generated variables. For example, a pool of candidate poses of the hand is iteratively refined by the stochastic optimizer and samples from the predicted distribution over poses are used to replace values in the pool of candidate poses. In this way improvements in hand pose accuracy have been found across a wide range of human hand pose and motion.

In some examples, such as those shown in FIG. 1, the user is able to point the fingers in arbitrary directions (not just towards the sensor) and the hand pose may still be accurately tracked. This may be achieved by configuring the prediction engine to predict a distribution over pose as mentioned above and as described in more detail in the examples below. The prediction engine may also enable the hand tracker to work successfully for different capture device 102 placements (such as those illustrated in FIG. 1 or others). The prediction engine may also enable the hand tracker to work successfully where there is motion of the capture device and/or full body motion.

In various examples, the hand tracker is operable with data from a single capture device which gives benefits of cost savings, space savings and simplicity over previous systems using multiple capture devices. In some examples, such as where a time of flight depth sensor is used, the range of distances from the sensor within which hand pose may be accurately tracked is around 10 cm to several meters which is a much larger range than many previous approaches. In some examples, the hand tracker is operable in real time.

In the examples shown in FIG. 1 the capture device 102 is in communication with a hand/body tracker 202 by a wired connection or a wireless connection. In some examples the hand/body tracker 202 is located in the cloud and provided as a cloud service to a computing device local to the user 100 such as a PC, tablet computer, mobile phone, game system or other end-user device.

Figure 2:
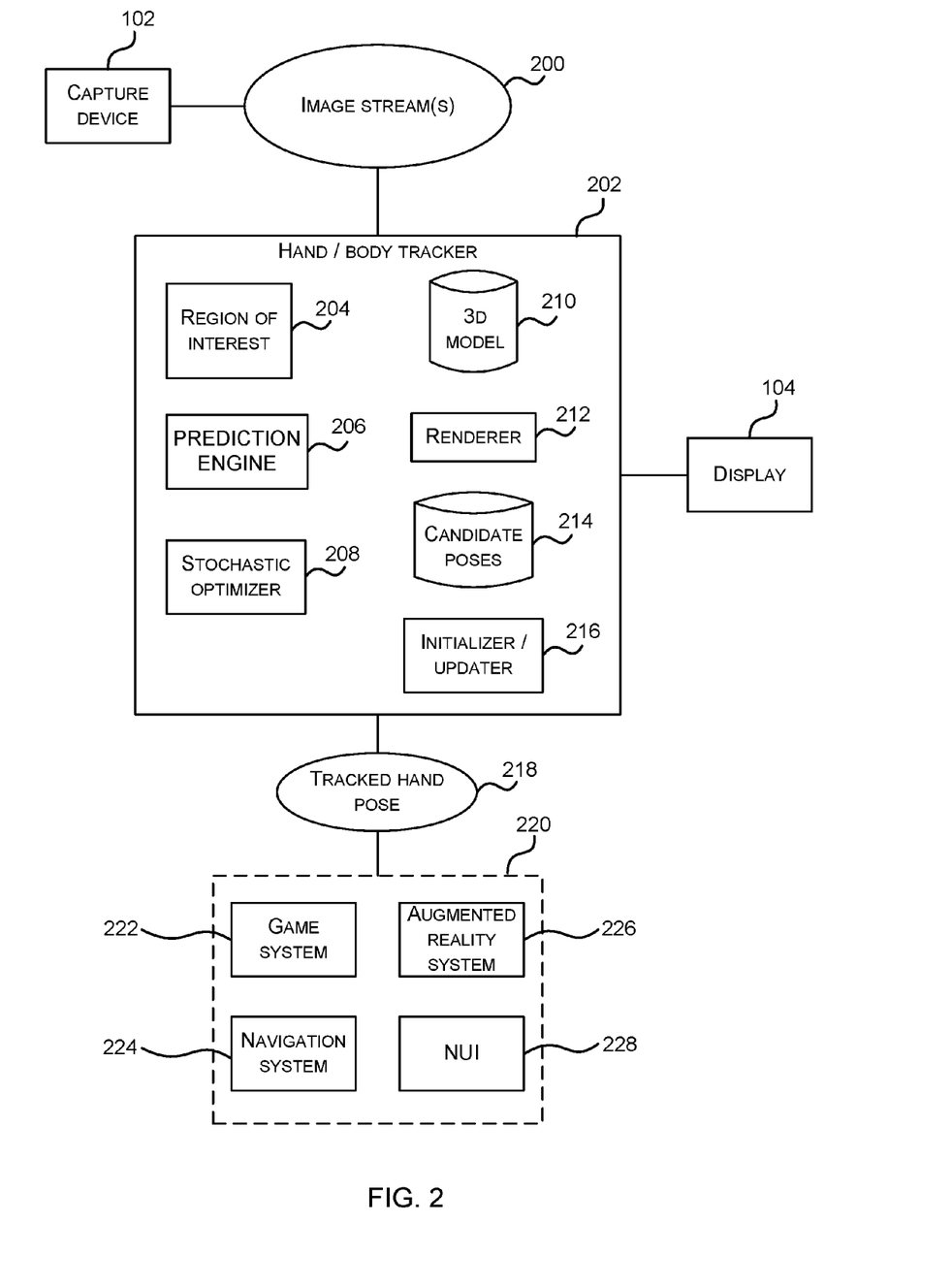
FIG. 2 is a schematic diagram of a hand/body tracker.

FIG. 2 is a schematic diagram of a computer-implemented hand/body tracker 202. The hand/body tracker 202 takes as input one or more image streams 200 from at least one capture device 102. The capture device 102 is able to capture one or more streams of images. For example, the capture device 102 comprises a depth camera of any suitable type such as time of flight, structured light, stereo, speckle decorrelation. In some examples the capture device 102 comprises a color (RGB) video camera in addition to, or in place of a depth camera. For example, data from a color video camera may be used to compute depth information. In some examples, where the capture device 102 is a time of flight sensor, the range of distances over which hand pose is accurately tracked using the examples described herein is found to be particularly large. The image streams 200 input to the hand/body tracker comprise frames of image data such as red, green and blue channel data for a color frame, depth values from a structured light sensor, three channels of phase data for a frame from a time of flight sensor, pairs of stereo images from a stereo camera, speckle images from a speckle decorrelation sensor.

The hand/body tracker 202 produces as output a stream of tracked hand (or body) pose values 218. The pose may be expressed as a vector (or other format) of values, one for each degree of freedom of the pose being tracked. For example, 10 or more, or 20 or more values. In one example, the pose vector comprises 3 degrees of freedom for a global rotation component, 3 degrees of freedom for a global translation component, and 4 degrees of freedom for each of a plurality of joint transformations). The joint transformations may be specified in a kinematic model of the hand which may or may not be anatomically valid.

In some examples the hand/body tracker 202 sends output to a display 104 such as the display shown in FIG. 1 although this is not essential. The output may comprise a synthetic image of the hand being tracked, rendered from a 3D hand model according to a current tracked pose of the user's hand.

In some examples the hand/body tracker 202 sends the tracked hand pose 218 to a downstream application or apparatus 220 such as a game system 222, a navigation system 224, an augmented reality system 226, a natural user interface 228. These are examples only and other downstream applications or apparatus may be used. The downstream application or apparatus 220 is able to use the tracked hand pose 218 to control and/or update the downstream application or apparatus.

The hand/body tracker 202 is computer implemented. In some examples all or part of the hand/body tracker is integral with the capture device 102. The hand/body tracker 202 comprises a region of interest component 204, a prediction engine 206, a stochastic optimizer 208, a memory holding a 3D model or having access to a 3D model 210, a renderer 212, a memory holding candidate poses 214 and an initializer/updater component 216.

The region of interest component 204 processes the image data to extract a foreground region depicting the user's hand or body. Any well-known foreground extraction technology may be used. For example, the foreground extraction technology may use color information in color images captured by the capture device 102 to detect and extract image elements depicting the user's hand.

As mentioned above, the prediction engine 206 comprises machine learning technology which may be arranged in a layered architecture. The prediction engine 206 takes region of interest image elements identified by the region of interest component 204 as input. The prediction engine calculates a distribution over hand or body pose. The prediction engine is described in more detail with reference to FIGS. 3 to 5.

The stochastic optimizer 208 may be a particle swarm optimizer, a genetic algorithm process, a hybrid of a particle swarm optimizer and a genetic algorithm process, or any other stochastic optimizer which iteratively refines a pool of candidate poses 214. A particle swarm optimizer is a way of searching for a solution to a problem by iteratively trying to improve a candidate solution in a way which takes into account other candidate solutions (particles in the swarm). A population of candidate solutions, referred to as particles, are moved around in the search-space according to mathematical formulae. Each particle's movement is influenced by its local best known position but, is also guided toward the best known positions in the search-space, which are updated as better positions are found by other particles. This is expected to move the swarm toward the best solutions. A genetic algorithm process is a way of searching for a solution to a problem by generating candidate solutions using inheritance, splicing, and other techniques inspired by evolution.

An example of a stochastic optimizer 208 which may be used is given below with reference to FIG. 8. However, other stochastic optimizers may be used.

The renderer 212 may be implemented using a graphics processing unit or any other suitable technology. Any well-known renderer may be used which is able to render synthetic images from a 3D model 210 using the tracked pose 218. In some examples the 3D model is a triangle mesh model of a hand or body in a base pose although other types of 3D models may be used.

The initializer/updater 216 acts to initialize the candidate pose pool 214 or update the candidate pose pool 214. An example method carried out by this component is described with reference to FIG. 6.

Alternatively, or in addition, the functionality of the hand/body tracker can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
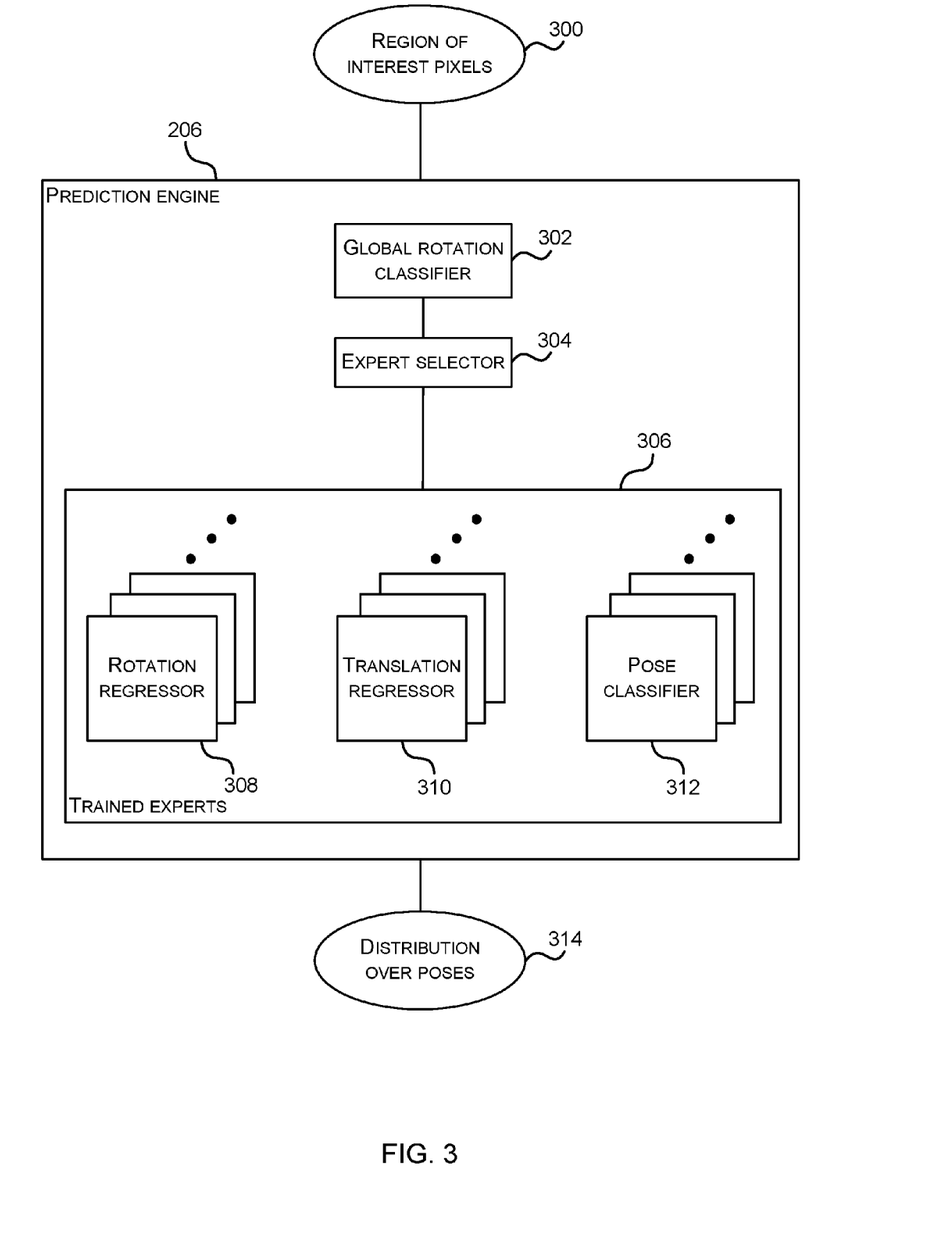
FIG. 3 is a schematic diagram of a prediction engine such as the prediction engine of FIG. 2.

FIG. 3 is a schematic diagram of a prediction engine such as the prediction engine of FIG. 2. In this example the prediction engine 206 has a layered architecture comprises a first layer which is a global rotation classifier 302 and a second layer 306 comprising trained experts. A trained expert is a trained machine learning system specialized, in this case, for a sub-set of global rotation values of the pose. The prediction engine 206 takes as input region of interest pixels 300 and produces as output a distribution over poses 314.

In an example the global rotation classifier 302 computes a distribution over global rotation bins. For example, given a region of interest it computes a distribution (such as a histogram) over a specified plurality of global rotation bins, where the distribution expresses the likelihood of the pose of the hand or body depicted in the region of interest having a global rotation that falls into the bins.

Any suitable number of global rotation bins may be used. In an example, the bins are specified by uniformly quantizing global rotation into a specified number of bins (such as 128 or any other number of bins).

In some examples the global rotation bins are calculated by uniformly sampling over the space of 3D rotations and clustering the samples using any well-known clustering method. This approach has been found to give particularly good hand tracking results.

In an example the samples over the space of 3D rotations are calculated using quaternions, where a quaternion rotation is a 4D vector of unit length that represents the set of all possible 3D rotations. Many random quaternion samples are calculated from the unit sphere and clustered using k-means clustering or another well-known clustering method.

However, it is not essential to use quaternions as described above. Other methods are possible in which roughly uniformly spaced quaternion samples are calculated from the unit sphere by using a calculation process which moves around the global rotation 4D unit sphere in a particular manner. Clusters do not need to be computed in this method.

Training data comprising image, rotation bin pairs is used to train the global rotation classifier 302. Any suitable type of classifier may be used such as a random forest, decision jungle, discriminative fern ensemble, neural networks, support vector machines, or others.

Empirical investigation of various different types of classifier has found that hand pose is tracked at particularly high speed and with high accuracy where a discriminative fern ensemble is used. For example, a discriminative fern ensemble with 50 ferns of depth 13 provided good classification accuracy at high speed (6 msec).

A random forest is comprises a plurality of decision trees each having a root node, a plurality of split nodes and a plurality of leaf nodes. At test time (when a previously unseen example is applied to the already trained random forest) Image elements of an image may be pushed through trees of a random decision forest from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification. One leaf node from each tree in the forest is reached and data stored at those leaf nodes during training is accessed. For example, this data comprises labeled training data in an aggregated form. The leaf node data found from each tree may be aggregated to produce a final output.

During training, parameter values (also referred to as features) are learnt for use at the split nodes and data is accumulated at the leaf nodes. For example, training data comprising labeled images are passed through the tree and split node test parameters are selected (from randomly generated possibilities) at each split node according to how well the split node test parameters deal with the training data at the split node. An information gain criterion or other well-known criterion may be used to assess how effectively the split node test parameters deal with the training data at the split node.

A decision jungle is a plurality of directed acyclic graphs configured as for a random decision forest, except that a plurality of the split nodes are merged together. That is, rather than being binary trees as in a random decision forest, the individual members of the jungle are directed acyclic graphs.

A discriminative fern ensemble is a plurality of look up tables containing aggregated training data indexed by index values where the aggregated training data (such as image labels in the case of image classification) and index values are learnt during a training phase. At test time the index values are computed from an unseen example, such as an image or a patch of image elements, (without the need to traverse a directed acyclic graph or decision tree) and used to look up aggregated training data from each fern table in the ensemble. The data looked up from each fern table is aggregated to calculate an output prediction, such as a distribution over class labels (in the case of a classification task). Discriminative fern ensembles are used for classification or regression tasks.

An expert selector 304 uses the output of the global rotation classifier 302 to select a plurality of trained experts from a large number of trained experts 306 making up a second stage of the prediction engine 206. In an example, three trained experts are selected: a rotation regressor 308, a translation regressor 310 and a pose classifier 312. For example, there are three trained experts for each global rotation bin. In the case there are 128 global rotation bins this gives 128×3=384 trained experts. The expert selector 304 obtains the distribution over global rotation bins from the global rotation classifier and it uses that information to select one or more global rotation bins. For each global rotation bin selected there are three (for example) trained experts and the region of interest pixels are pushed into those trained experts. In an example the expert selector 304 selects the top five ranking global rotation bins in the distribution over global rotation bins from the global rotation classifier.

Because so many trained experts 306 are present in the second stage of the prediction engine 206, limited memory and processing resources are under pressure. Careful selection of the type of machine learning technology enables large numbers of trained experts 306 to be accommodated in practical working solutions. For example, decision jungles are used to implement the trained experts 306.

In an example the rotation regressor 308 is trained using Gaussian entropy estimation on quaternions, resolving the quaternion sign by choosing the sign closest to the pose cluster center. As the pose clusters occupy a relatively small region of the unit 4-sphere the Gaussian model is a reasonable fit.

In an example the translation regressor 310 is an offset regression jungle trained using Gaussian entropy estimation as a split criterion.

In an example the pose classifier 312 is trained to classify the image elements into a plurality of hand pose classes such as open, flat, halfopen, closed, pointing, pinching. Experimental work has found these six hand pose classes to give good results; although other hand pose classes may also be used.

In some examples the pose classifier 312 is replaced by a pose regressor which regresses the joint rotations for the finger joints. In some example, both a pose classifier 312 and a pose regressor are used.

Figure 4:
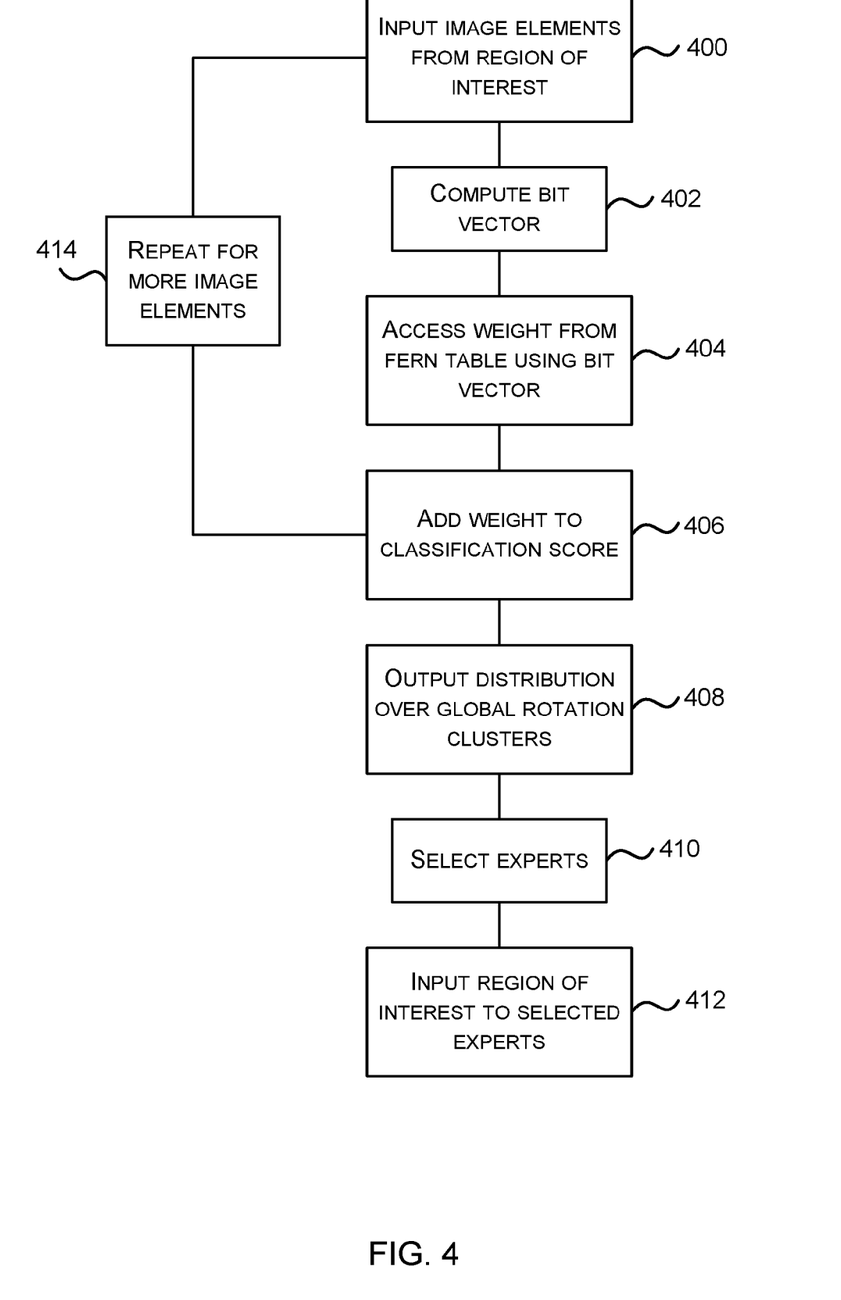
FIG. 4 is a flow diagram of a first part of a method at the prediction engine of FIG. 3.

FIG. 4 is a flow diagram of a first part of a method at the prediction engine of FIG. 3. In this example the first stage of the prediction engine is used and comprises a discriminative fern ensemble that has already been trained (that is, the method of FIG. 4 is a test time process where a new frame, or an image of a frame, not previously seen by the tracker, is being processed). A region of interest 400 is input to the process from the region of interest component. A bit vector is computed 402 from the region of interest pixels. For example, the bit vector is computed by, for individual pixels of the region of interest (for example a subset of the pixels of the region of interest), computing pairwise pixel comparisons in a patch around the pixel. In some examples a random selection of pairs of pixels are used. A subset of the available pixel pairs may be used. The results of each comparison may be expressed as a single bit value of 0 or 1. For example, the comparisons may be tests such as "is the depth value at pixel 1 greater than at pixel 2" or "is the infra-red intensity value at pixel 1 greater than at pixel 2" or "is the average brightness value at pixel 1 greater than at pixel 2". For each fern and pixel there are K bits computed and these bits may be represented in a K dimensional bit vector. The number of bits K is selected according to the application domain and according to accuracy/speed trade off settings. A thresholding process or Heaviside function may be applied to the bit vector in order to remove the influence of small oscillations due to noise. This results in many bit vectors. Each fern produces one bit vector for each pixel of the region of interest.

Each bit vector is used to access a weight from a fern table 404 and the weight is added to a classification score. (During a training phase the fern table is created and populated with weights.) The process of steps 400 to 406 is repeated 414 for more image elements from the region of interest and also for more ferns in the ensemble 407. As a result the discriminative fern ensemble outputs a distribution over global rotation clusters 408 which is used to selected experts 410. The region of interest pixels are input to the selected experts.

During training the fern tables are created and populated with weights. For example, training data comprising regions of interest labeled with global rotation bins are accessed. Bit vectors are computed from a labeled region of interest as described above. The bit vectors from an individual fern are aggregated. For example, by taking an average, median, mode, or in any other way. In some examples the aggregation is done in a way which takes into account positions of the pixels with respect to each other in the region of interest. For example, by dividing the region of interest into sub regions and computing a histogram of the bit vectors over the sub-regions. A concatenation of the fern histograms is labeled training data for a classifier such as a linear classifier. Weights of the classifier which are learnt during training of the classifier are the weights stored in the fern table. Any well know classifier may be used such as a support vector machine.

Figure 5:
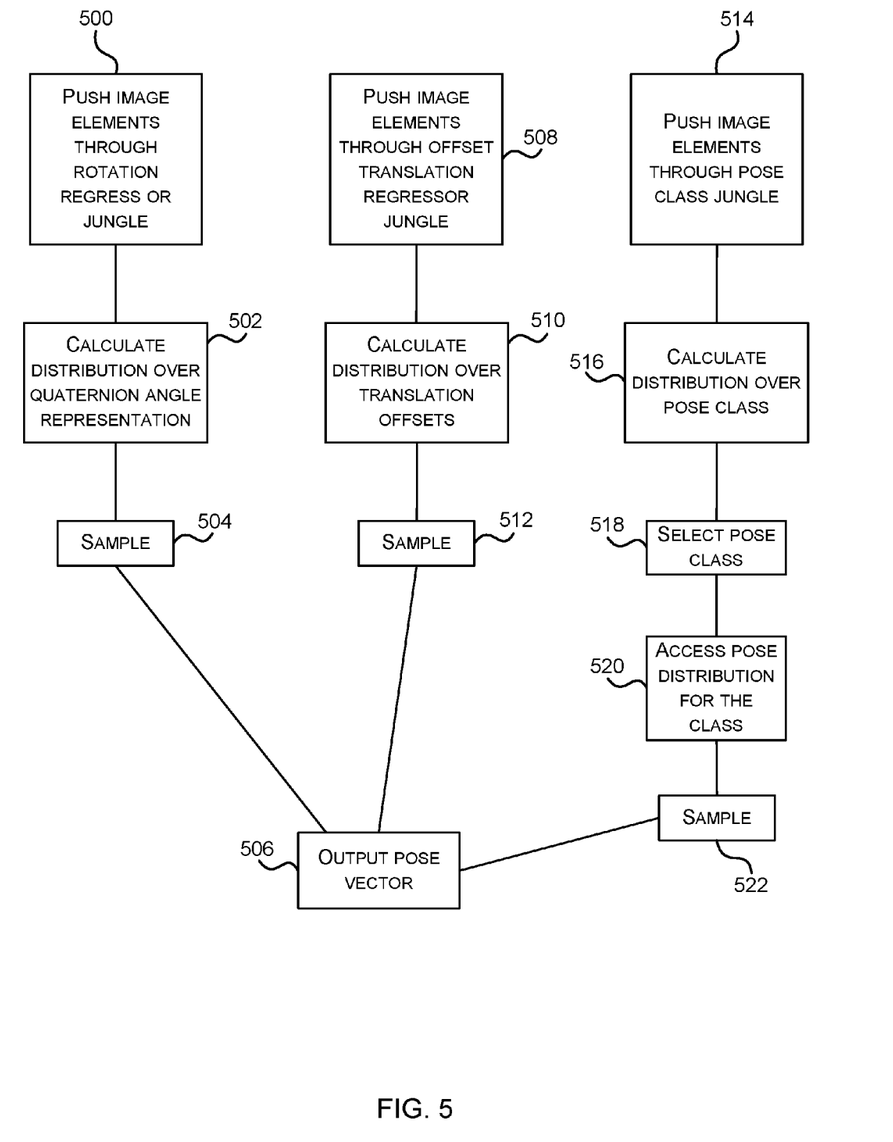
FIG. 5 is a flow diagram of a second part of the method of FIG. 4.

FIG. 5 is a flow diagram of a second part of the test time process of FIG. 4 at the second layer of the prediction engine. Image elements from the region of interest are pushed through the rotation regressor jungle 500, the offset translation regressor jungle 508 and the pose class jungle 514. These processes may operate in parallel or in series.

The rotation regressor jungle calculates a distribution 502 over a quaternion angle representation of the global rotation component of the pose. The offset translation regressor jungle computes a distribution over translation offsets 510 (offsets from the image element being processed by the classifier to a root joint (the wrist for example)). The pose classifier calculates a distribution over pose classes 516.

Samples 504, 512 may be taken from the distributions calculated by the rotation regressor jungle and the offset translation regressor jungle. These samples are used to form part of an output pose vector 506. A pose class is selected 518 using the distribution over pose classes and used to access 520 a pre-specified pose distribution for the class. This pre-specified distribution is sampled 522 to obtain values to go in the output pose vector 506.

The pre-specified pose distributions are each a generative model for a sub-set of pose space with a mean shape corresponding to the pose class name (such as open, flat, halfopen, closed, pointing, pinching), and a set of randomization rules which define a set of poses that can be drawn from the model. These are examples of pose classes which may be used. However, other pose classes may be used.

Figure 6:
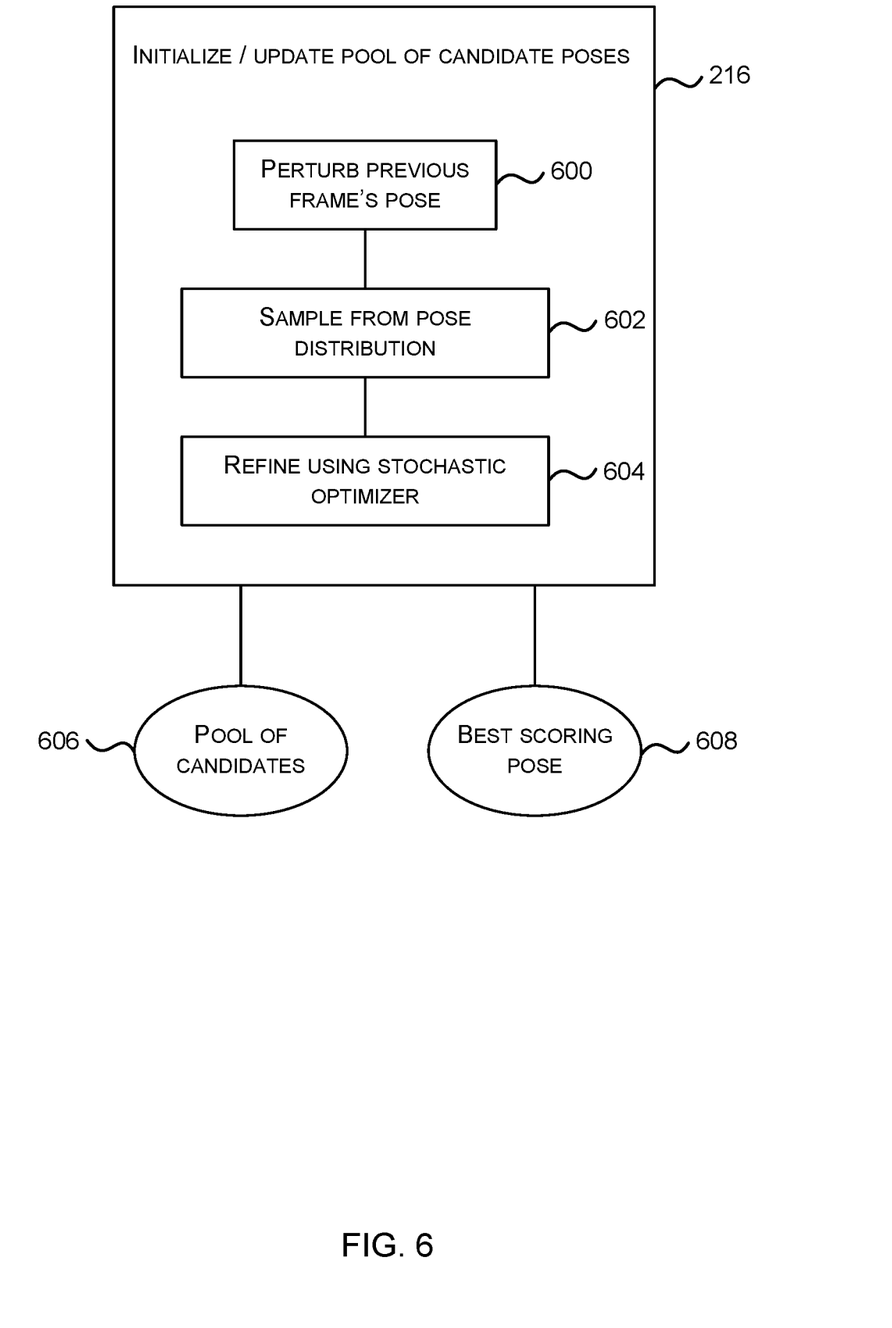
FIG. 6 is a flow diagram of a method of initializing or updating a pool of candidate poses.

FIG. 6 is a flow diagram of a method of initializing or updating a pool of candidate poses. This method may be executed by the initializer/updater 216. In situations where pose calculated from a previous frame is available, this pose is perturbed 600 to create candidate pose values that are stored in the pool of candidates 606. Step 600 may be omitted, for example, where pose from a previous frame is not available. Samples are taken 602 from the pose distribution calculated by the prediction engine and used to initialize the pool of candidates 606 and/or to replace poorly scoring candidates in the pool. A scoring component is used to calculate the scores as described in more detail below. The candidates in the pool are refined 604 using the stochastic optimizer. For example, as explained with reference to FIG. 8. A best scoring pose 608 may be output.

Figure 7:
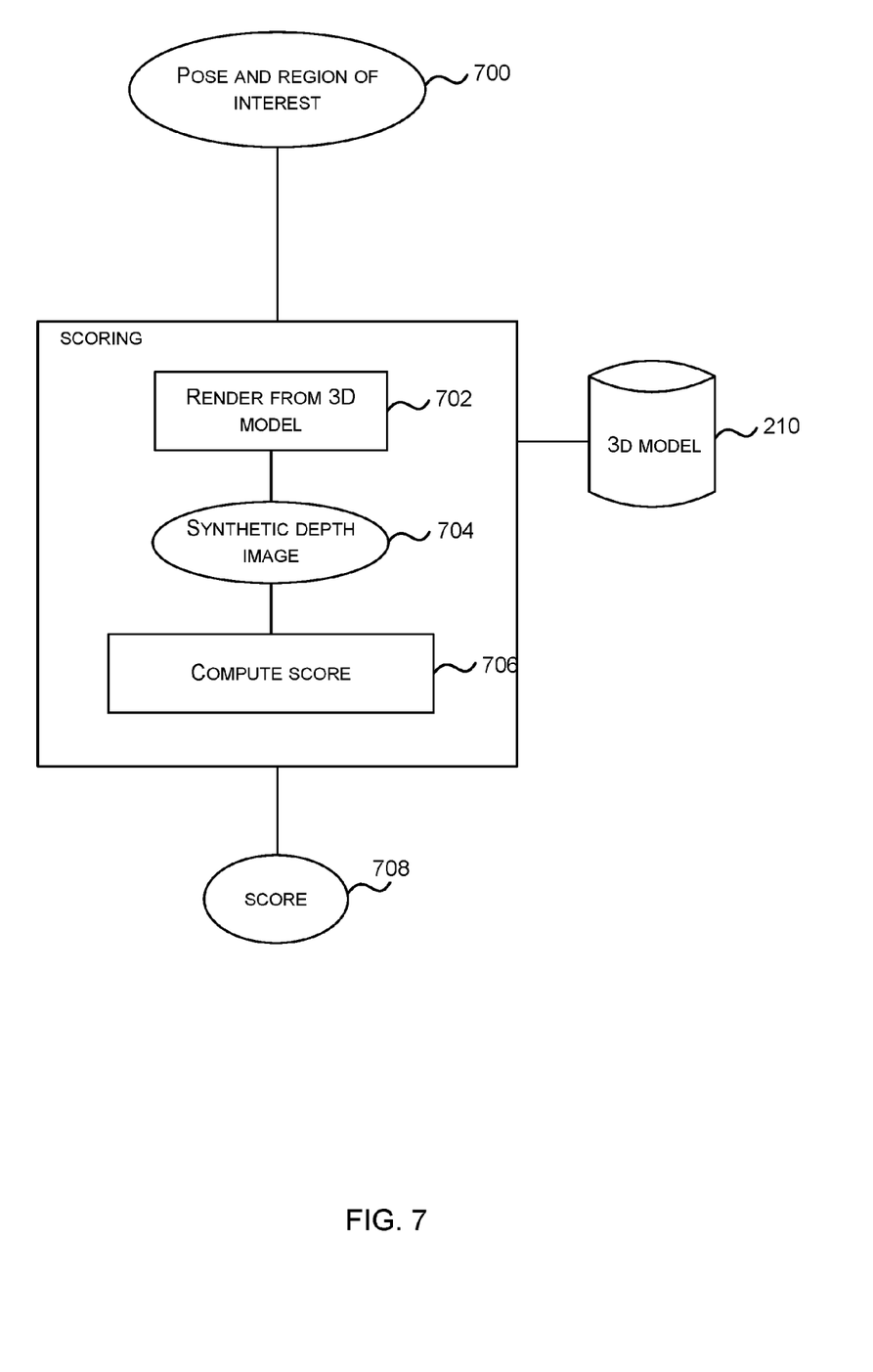
FIG. 7 is a flow diagram of a scoring process.

FIG. 7 is a flow diagram of a scoring process which may be carried out by the stochastic optimizer or any of the other components of the hand/body pose tracker 202. A pose and a region of interest 700 are input to the scoring process. The pose is used by the renderer 212 to render 702 a synthetic depth image 704 from the 3D model 210. The synthetic depth image is compared with the region of interest to compute 706 a score and the score is output 708. The renderer make take into account occlusions.

The comparison process may comprise computing a sum over image pixels of the absolute or squared difference between the rendered image and the observed image. In some examples the sum has a robust penalty term applied such as Geman-McClure, or Cauchy, to help reduce the effect of outliers. Other types of comparison process may also be used.

Figure 8:
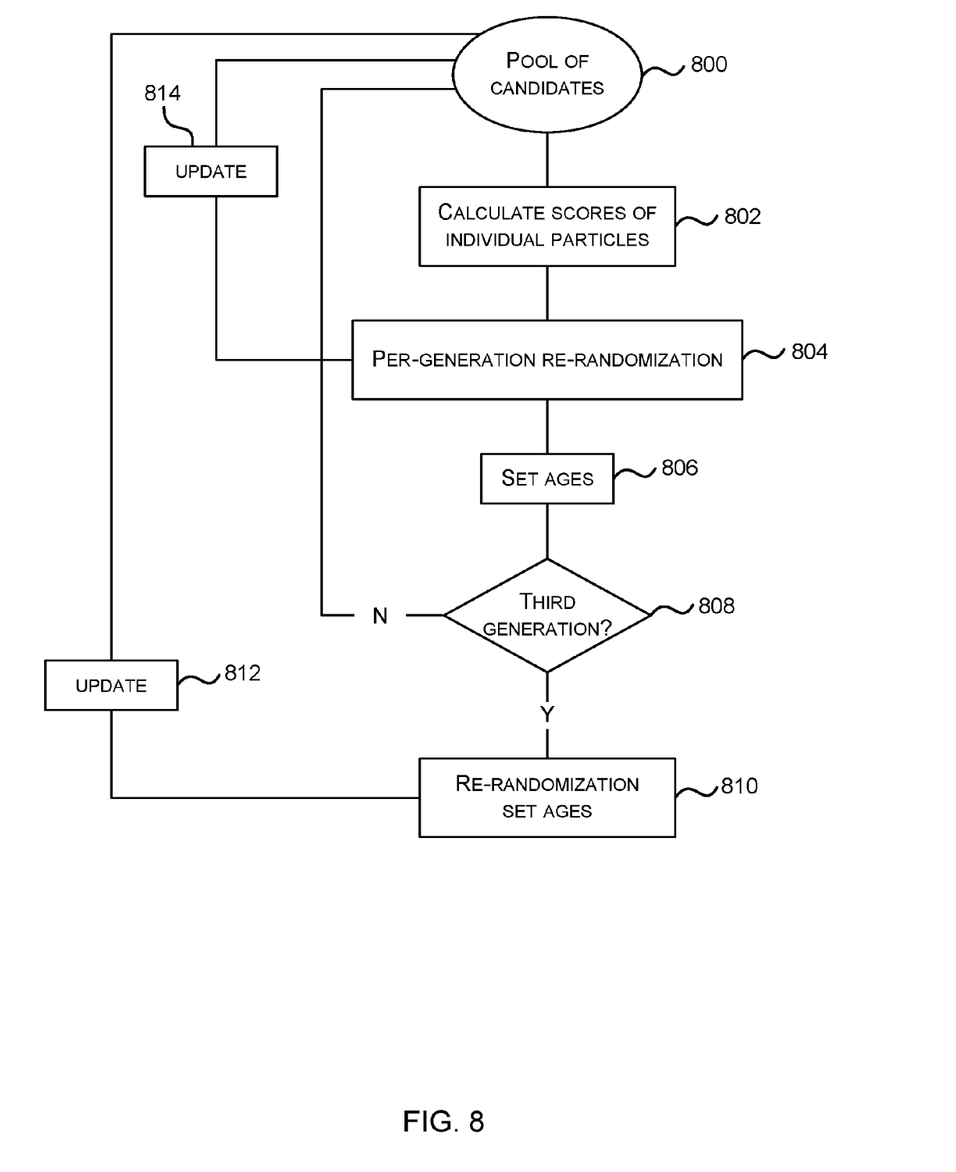
FIG. 8 is a flow diagram of a process at a stochastic optimizer.

FIG. 8 is a flow diagram of an example method at the stochastic optimizer in the case that the stochastic optimizer is a hybrid of a particle swarm optimizer and genetic algorithms. In this example the stochastic optimizer uses splicing which is a type of genetic algorithm process. The stochastic optimizer also uses candidate solutions in the pool to influence other candidate solutions in the pool, which is a type of particular swarm optimization process. However, these are examples only and other features of genetic algorithms and particle swarm processes may be combined in the hybrid.

The stochastic optimizer maintains a population of particles (the pool of candidate solutions each having an associated region of interest) and the scoring function described above is evaluated on the population in parallel, yielding a score for each candidate solution. Each such evaluation comprises one generation. It is found experimentally that how the next generation is populated given the current particles has a big influence on performance of the process. The particular process of FIG. 8 is found to give good results although other types of stochastic optimization process may also be used.

The current pool of candidates 800 is used to calculate scores of the individual particles 802. This results in tuples of values, each tuple comprising a score, a pose and a region of interest. A per-generation re-randomization process 804 is carried out. This comprises adjusting the pose of 50% of the particles in the pool. The re-randomized particles may have their ages set 806 to a maximum age value.

A check is made 808 for any particles which have reached the third generation. Particles which have not reached their third generation remain in the pool of candidates and continue in the process. Particles which have reached their third generation enter a second re-randomization process 810. In the second re-randomization process a first portion of the particles are replaced by poses sampled from the pose distribution calculated by the prediction engine. A second portion of the particles are subjected to local random perturbation. A third portion of the particles are subject to a splicing operation whereby a random particle is chosen from the top-ranked sub-set of the particles and the current particle overwrites, from the selected particle, a sub-set of the pose parameters. The re-randomized particles may have their ages set to zero.

In the situation where particles have ages and the ages are set as described above in steps 806 and 810, the process of FIG. 8 treats all particles within a given age as an independent swarm. This treats candidate poses with different ages as being in different candidate pose pools. Accuracy is then improved by reducing interpolation across pose parameters such as global rotation parameters. However, it is not essential to take into account particle ages.

Figure 9:
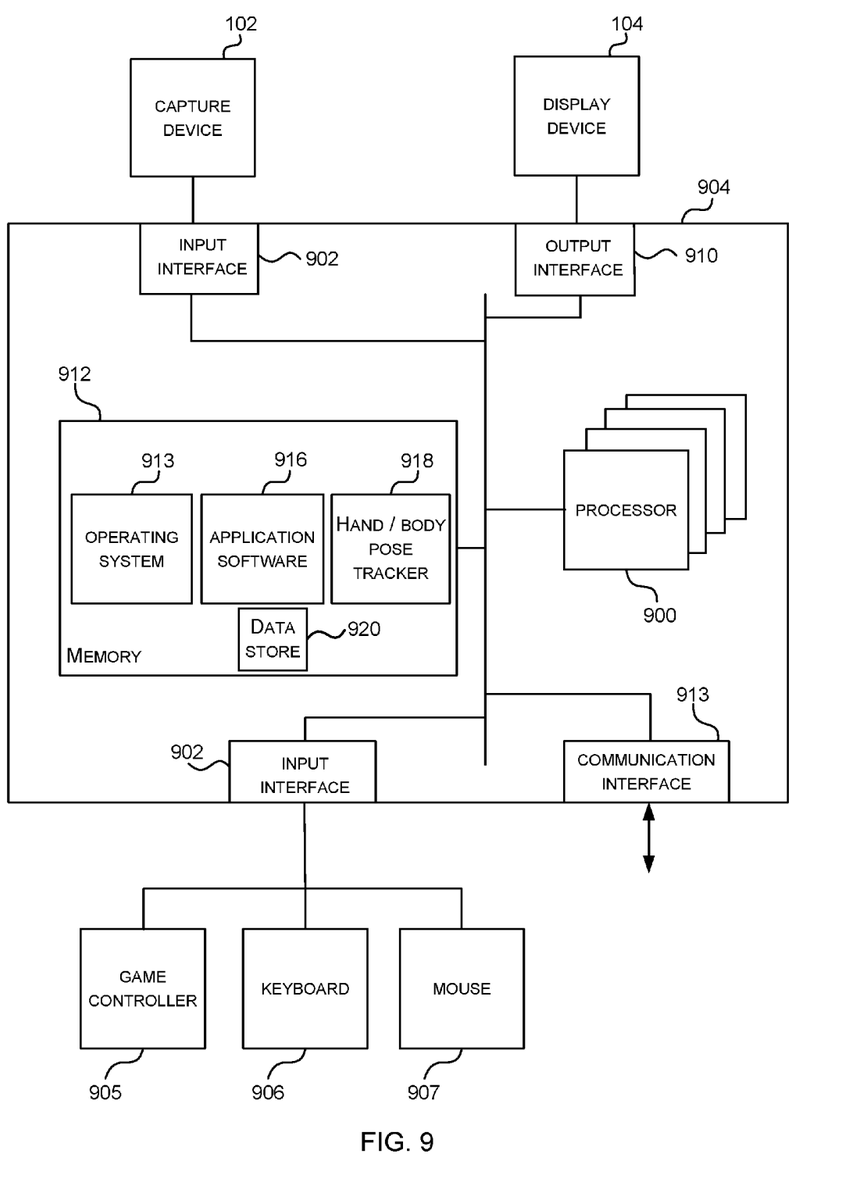
FIG. 9 illustrates an exemplary computing-based device in which embodiments of a hand or body tracker may be implemented.

FIG. 9 illustrates various components of an exemplary computing-based device 904 which may be implemented as any form of a computing and/or electronic device, and in which embodiments of a hand/body tracker may be implemented. For example, a mobile phone, a tablet computer, a laptop computer, a personal computer, a web server, a cloud server.

Computing-based device 904 comprises one or more processors 900 which may be microprocessors, controllers or any other suitable type of processors for processing computer executable instructions to control the operation of the device in order to accurately track pose of hands or bodies in real time. In some examples, for example where a system on a chip architecture is used, the processors 900 may include one or more fixed function blocks (also referred to as accelerators) which implement a part of the method of any of FIGS. 4 to 8 in hardware (rather than software or firmware). Platform software comprising an operating system 913 or any other suitable platform software may be provided at the computing-based device to enable application software 916 to be executed on the device. A data store 920 stores candidate poses, regions of interest, image data, tracked pose and/or other data. A hand/body tracker 918 comprises instructions to execute a part of the method of any of FIGS. 4 to 8.

The computer executable instructions may be provided using any computer-readable media that is accessible by computing based device 904. Computer-readable media may include, for example, computer storage media such as memory 912 and communications media. Computer storage media, such as memory 912, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 912) is shown within the computing-based device 904 it will be appreciated that the storage may be distributed or located remotely and accessed via a network or other communication link (e.g. using communication interface 913).

The computing-based device 904 also comprises an output interface 910 arranged to output display information to a display device 104 which may be separate from or integral to the computing-based device 904. For example, in the case of a tablet computer the display device 104 is integral with the computing-based device. The display information may provide a graphical user interface. An input interface 902 is also arranged to receive and process input from one or more devices, such as a user input device (e.g. a mouse 907, keyboard 906, game controller 905) and from the capture device 102 described above. In some examples the user input device may detect voice input, user gestures or other user actions and may provide a natural user interface (NUI). In an embodiment the display device 104 may also act as a user input device if it is a touch sensitive display device. The output interface 910 may also output data to devices other than the display device, e.g. a locally connected printing device.

Any of the input interface 902, output interface 910, display device 104 and the user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example there is a method of tracking pose of a hand or body comprising:
receiving a stream of images depicting the hand or body;
inputting at least part of one of the images to a prediction engine to obtain a distribution over poses of the hand or body;
accessing a pool of candidate poses of the hand or body and using a stochastic optimizer to iteratively refine the candidate poses; and
periodically replacing a sub-set of the candidate poses in the pool with samples from the distribution over poses of the hand or body.

In an example the method comprises initializing the pool of candidate poses with samples from the distribution over poses of the hand or body.

In an example the method comprises inputting at least part of one of the images to the prediction engine comprises inputting the at least part of one of the images to a plurality of layers of the prediction engine.

The embodiment described in the previous paragraph may also be combined with inputting the at least part of one of the images to a first layer of the prediction engine comprising a classifier arranged to calculate a distribution over global rotation classes of the pose.

In an example inputting at least part of one of the images to the prediction engine comprises inputting the at least part of one of the images to a first layer of the prediction engine and receiving a result from the first layer, and inputting the at least part of one of the images to part of a second layer of the prediction engine, the part of the second layer being selected using the result.

The example in the paragraph immediately above may comprise inputting the at least part of one of the images to a first layer of the prediction engine comprising a discriminative fern ensemble.

The example above may comprise inputting at least part of one of the images to the prediction engine comprises inputting the at least part of one of the images to a first layer of the prediction engine comprising a classifier, and to a second layer of the prediction engine comprising a plurality of decision jungles.

In some examples using the stochastic optimizer to iteratively refine the candidate poses comprises randomly adjusting the pose of a sub-set of the candidate poses by making local random perturbations and/or by replacing a subset of parameters of a pose candidate with parameters from another pose candidate.

In some examples using the stochastic optimizer comprises assigning an age to each candidate pose, incrementing the age if the candidate pose is randomly adjusted, and treating candidate poses with different ages as being in different candidate pose pools.

In some examples using the stochastic optimizer comprises computing scores of candidate poses of the pool by rendering synthetic images from a 3D hand or body model in a manner which takes into account occlusions.

In one or more of the examples the stream of images depicting the hand or body is received from a moving capture device.

In examples the stream of images depicting the hand or body is received from a capture device located over the shoulder of a user.

In examples the plurality of decision jungles comprises rotation regressors, translation regressors and pose classifiers.

Some examples comprise computing the samples by using a pre-specified distribution over pose for each of a plurality of pose classes.

In examples a computer program, stored on a computer readable medium, carries out any of the methods described above.

In an example, a hand or body pose tracker comprises:
an input interface arranged to receive an image depicting the hand or body;
a processor arranged to input at least part of the image to a prediction engine to obtain a distribution over poses of the hand or body;
a stochastic optimizer arranged to access a pool of candidate poses of the hand or body and to iteratively refine the candidate poses;
the processor arranged to periodically replace a sub-set of the candidate poses in the pool with samples from the distribution over poses of the hand or body.

In examples the hand or body pose tracker described immediately above comprises a renderer implemented at least in part on a parallel processing unit, the stochastic optimizer being arranged to use the renderer as part of a scoring process.

In examples, the hand or body pose tracker comprises the prediction engine, the prediction engine having a layered architecture.

In examples, the hand or body pose tracker comprises the prediction engine, the prediction engine having a first layer comprising a global rotation classifier.

In examples, the hand or body pose tracker comprises the prediction engine, the prediction engine having a plurality of trained experts being decision bungles.

In an example there is a computer readable medium storing instructions which when executed by a computing device control the device to:
receive a stream of images depicting a hand of a user;
input at least part of one of the images to a layered prediction engine to obtain a distribution over poses of the hand;
access a pool of candidate poses of the hand or body and use a stochastic optimizer to iteratively refine the candidate poses; and
periodically replace a sub-set of the candidate poses in the pool with samples from the distribution over poses of the hand or body.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of tracking pose of a hand or body comprising:
receiving a stream of images depicting the hand or body;
inputting at least part of one of the images to a plurality of layers of a prediction engine to obtain a distribution over poses of the hand or body;
accessing a pool of candidate poses of the hand or body; and
periodically replacing a sub-set of the candidate poses in the pool with samples from the distribution over poses of the hand or body.

2. A method as recited in claim 1, further comprising initializing the pool of candidate poses with samples from the distribution over poses of the hand or body.

3. A method as recited in claim 2, further comprising computing the samples by using a pre-specified distribution over pose for each of a plurality of pose classes.

4. A method as recited in claim 1, wherein the plurality of layers of the prediction engine include a first layer comprising a classifier arranged to calculate a distribution over global rotation classes of the pose.

5. A method as recited in claim 1, wherein the plurality of layers of the prediction engine include a first layer comprising a discriminative fern ensemble.

6. A method as claimed in claim 1, wherein the plurality of layers of the prediction engine include:
a first layer comprising a classifier; and
a second layer comprising a plurality of decision jungles.

7. The method as claimed in claim 6 wherein the plurality of decision jungles comprises rotation regressors, translation regressors and pose classifiers.

8. A method as recited in claim 1, further comprising using a stochastic optimizer to iteratively refine the candidate poses.

9. A method as recited in claim 8, wherein using the stochastic optimizer to iteratively refine the candidate poses comprises randomly adjusting the pose of a sub-set of the candidate poses by making local random perturbations.

10. A method as recited in claim 8, wherein using the stochastic optimizer to iteratively refine the candidate poses comprises randomly adjusting the pose of a sub-set of the candidate poses by replacing a subset of parameters of a pose candidate with parameters from another pose candidate.

11. A method as recited in claim 8, wherein using the stochastic optimizer iteratively refine the candidate poses comprises:
   assigning an age to each candidate pose;
   incrementing the age if the candidate pose is randomly adjusted; and
   treating candidate poses with different ages as being in different candidate pose pools.

12. A method as recited in claim 8, wherein using the stochastic optimizer to iteratively refine the candidate poses comprises computing scores of candidate poses of the pool by rendering synthetic images from a 3D hand or body model in a manner which takes into account occlusions.

13. A method as recited in claim 1 wherein the stream of images depicting the hand or body is received from a moving capture device.

14. A method as recited in claim 1 wherein the stream of images depicting the hand or body is received from a capture device located over the shoulder of a user.

15. A system comprising:
   a processor;
   a memory;
   an input interface arranged to receive an image depicting the hand or body;
   a prediction engine stored in the memory and executed on the processor; the prediction engine configured to:
   receive at least part of the image; and
   determine a distribution over poses of the hand or body;
   a stochastic optimizer stored in the memory and executed on the processor, the stochastic optimizer configured to iteratively refine candidate poses in a pool of candidate poses of the hand or body; and
   a hand or body pose tracker stored in the memory and executed on the processor, the hand or body pose tracker configured to periodically replace a sub-set of the candidate poses in the pool of candidate poses with samples from the distribution over poses of the hand or body.

16. A system as recited in claim 15, further comprising a renderer implemented at least in part on a parallel processing unit, wherein the stochastic optimizer is further configured to use the renderer as part of a scoring process.

17. A system as recited in claim 15, wherein the prediction engine has a layered architecture.

18. A system as recited in claim 17, wherein the prediction engine includes a first layer comprising a global rotation classifier.

19. A system as recited in claim 15, wherein the prediction engine includes a plurality of trained experts being decision jungles.

20. One or more computer storage media, as hardware, storing instructions that, when executed by a computing device; control the computing device to:
   receive a stream of images depicting a hand or a body of a user;
   input at least part of one of the images to a plurality of layers of a prediction engine to obtain a distribution over poses of the hand or body;
   access a pool of candidate poses of the hand or body; and
   periodically replace a sub-set of the candidate poses in the pool with samples from the distribution over poses of the hand or body.

* * * * *